US011581102B2

(12) United States Patent
Hoover

(10) Patent No.: US 11,581,102 B2
(45) Date of Patent: Feb. 14, 2023

(54) NUCLEAR CONTROL SYSTEM WITH NEURAL NETWORK

(71) Applicant: Westinghouse Electric Company LLC, Cranberry Township, PA (US)

(72) Inventor: Ryan J. Hoover, Pittsburgh, PA (US)

(73) Assignee: Westinghouse Electric Company LLC, Cranberry Township, PA (US)

(*) Notice: Subject to any disclaimer, the term of this patent is extended or adjusted under 35 U.S.C. 154(b) by 576 days.

(21) Appl. No.: 16/564,387

(22) Filed: Sep. 9, 2019

(65) Prior Publication Data

US 2021/0074442 A1    Mar. 11, 2021

(51) Int. Cl.
| | |
|---|---|
| *G05B 13/02* | (2006.01) |
| *G21D 3/00* | (2006.01) |
| *G06N 3/04* | (2023.01) |
| *G06N 3/08* | (2023.01) |
| *G21D 3/08* | (2006.01) |

(52) U.S. Cl.
CPC ............ *G21D 3/002* (2019.01); *G05B 13/027* (2013.01); *G06N 3/0454* (2013.01); *G06N 3/08* (2013.01); *G21D 3/08* (2013.01)

(58) Field of Classification Search
CPC ........ G21D 3/002; G21D 3/08; G05B 13/027; G06N 3/0454; G06N 3/08; Y02E 30/00
USPC ......................................................... 706/23
See application file for complete search history.

(56) References Cited

U.S. PATENT DOCUMENTS

| | | | |
|---|---|---|---|
| 7,555,092 B2 | 6/2009 | Russell, II et al. | |
| 8,737,557 B2 | 5/2014 | Pop et al. | |
| 8,958,989 B2 | 2/2015 | Legendre et al. | |
| 9,377,287 B2 | 6/2016 | Tian et al. | |
| 9,472,311 B2 | 10/2016 | Pop et al. | |
| 9,857,171 B2 | 1/2018 | Fischer | |
| 10,746,524 B2 | 8/2020 | Qi | |

(Continued)

FOREIGN PATENT DOCUMENTS

| | | |
|---|---|---|
| CN | 100412993 C | 8/2008 |
| EP | 3026510 A1 | 6/2016 |

(Continued)

OTHER PUBLICATIONS

Holding, G. et al. "Deep Learning for fault detection in wind turbines", Renewable and Sustainable Energy Reviews 98 (2018) journal homepage: www:elsevier.com/locate/rser, https://doi.org/10.1016/j.rser.2018.09.012, Received Jan. 29, 2018, Elsevier Ltd., pp. 189-198.

(Continued)

*Primary Examiner* — Charlotte M Baker
(74) *Attorney, Agent, or Firm* — K&L Gates LLP

(57) ABSTRACT

A method of controlling a nuclear power plant includes obtaining sensor data from one or more sensors of the nuclear power plant, providing the sensor data and a desired plant response to a neural network, wherein the neural network has been previously trained using a simulated nuclear power plant and is structured to determine at least one control system setting to achieve the desired plant response, determining at least one control system setting to achieve the desired plant response with the neural network, and setting or changing at least one control system setting of a control system of the nuclear power plant to the at least one control system setting determined by the neural network.

20 Claims, 4 Drawing Sheets

(56) References Cited

U.S. PATENT DOCUMENTS

| | | | |
|---|---|---|---|
| 2007/0055392 A1 | 3/2007 | D'Amato et al. | |
| 2011/0060582 A1* | 3/2011 | Yu | G21D 3/001 |
| | | | 700/292 |
| 2020/0402679 A1* | 12/2020 | Hashemian | G05B 19/042 |
| 2021/0098143 A1* | 4/2021 | Trojer | G21C 5/10 |

FOREIGN PATENT DOCUMENTS

| | | |
|---|---|---|
| JP | 3287098 A | 3/2002 |
| TW | 594790 B | 6/2004 |

OTHER PUBLICATIONS

Zhixing Tian et al., "Preliminary Study of PHM System Based on Data Driven", Applied Mechanics and Materials, ISSN: 1662-7482, vol. 868, doi: 10.4028/www.scientific.net/AMM.868.299, 2017 Trans Tech Publications, Switzerland, 1 page.

Jianing Man et al., "Data-driven predictive analytics of unexpected wind turbine shut-downs", IET Renewable Power Gener., 2018, vol. 12, Iss. 15, pp. 1833-1842, © The Institution of Engineering and Technology 2018.

Search Report for corresponding TW Application No. 109130900, dated Feb. 11, 2022.

Search Report for corresponding TW Application No. 109130900, dated Oct. 5, 2022.

* cited by examiner

NUCLEAR CONTROL SYSTEM WITH NEURAL NETWORK

BACKGROUND

1. Field

The disclosed concept generally relates to nuclear control systems, and, more particularly, to utilizing a neural network to generate settings for a nuclear control system. The disclosed concept also relates to training a neural network for use with a nuclear control system.

2. Related Art

Nuclear power plants include numerous components and sensors. For example, nuclear power plants include in-core sensors for directly measuring the radioactivity within the core at a number of axial elevations. Thermocouple sensors are also located at various points around the core at an elevation where the coolant exits the core to provide a direct measure of coolant outlet temperature at various radial locations. These sensors are used to directly measure the radial and axial distribution of power inside the reactor core. This power distribution measurement information is used to determine whether the reactor is operating within nuclear power distribution limits. The typical in-core sensor used to perform this function is a self-powered detector that produces an electric current that is proportional to the amount of fission occurring around it. This type of sensor is generally disposed within an instrument thimble within various fuel assemblies around the core, does not require an outside source of electrical power to produce the current, is commonly referred to as a self-powered detector. Nuclear power plants include various sensors able to measure various flows, temperatures, pressures, valve positions, and other characteristics of the nuclear power plant.

Nuclear power plant also include various components such as valves and pumps that are controllable. For example, valves may be moved between various positions to allow or stop flows of water or other fluid between various components of the nuclear reactor system. Similarly, pumps may be controllable to increase or decrease flows of water or other fluids between various components of the nuclear reactor system. Nuclear reactor systems also include various other controllable components.

Nuclear power plants also include a control system for controlling the various controllable components. The control system has various settings, such as settings to place certain valves in certain positions, to control certain pumps at certain levels, or to control various other components in various manners. By controlling the various components, the power output of the nuclear reactor system can be controlled.

FIG. 1 is a simplified schematic diagram of a nuclear power plant 10. The nuclear power plant 10 includes a control system 12, sensors 14, and components 16. The control system 12 receives outputs of the sensors 14 and in turn controls the components 16 based on the outputs of the sensors 14.

For example, in pressurized water reactors (PWRs), pressurized water is heated in the reactor core and then flows to a steam generator (SG) where steam is generated to turn turbines to spin an electric generator to generate electricity. One particular item of concern is the SG level as it is responsible for a large number of plant events. Based on the outputs of sensors within the nuclear reactor system, the control system can control various components to regulate the SG level. However, control systems cannot perfectly control the SG level. For example, degradation of the performance of parts such as, for example, pumps, can result in the performance of the pump falling short of its intended setting. That is, the control system may control the pump to operate at a specified level, but due to degradation of the pump, the pump will actually operate at a lower level. Additionally, transients in the nuclear reactor system, such as pumps going offline or other events, can make it difficult to devise control system settings to realize the desired SG level.

Due to concerns with control system settings failing to always provide the desired response, safety margins and safety functions must be employed to ensure safe operation even when the control system cannot provide the desired response. The safety margins often result in nuclear reactor systems operating below maximum power or tripping well before it reaches a critical level.

There is room for improvement in control systems for nuclear power plants.

SUMMARY

The disclosed concept provides an improved method of controlling a nuclear power plant by employing a neural network trained to determine at least one control setting to achieve a desired plant response.

In one embodiment, a method of controlling a nuclear power plant comprises: obtaining sensor data from one or more sensors of the nuclear power plant; providing the sensor data and a desired plant response to a neural network, wherein the neural network has been previously trained using a simulated nuclear power plant and is structured to determine at least one control system setting to achieve the desired plant response; determining at least one control system setting to achieve the desired plant response with the neural network; and setting or changing at least one control system setting of a control system of the nuclear power plant to the at least one control system setting determined by the neural network.

In one embodiment, a method of training a neural network to determine at least one control system setting for a nuclear power plant comprises: providing a simulation of the nuclear power plant; generating training and test data by inputting a plurality of control system settings and nuclear power plant parameters into the simulation of the nuclear power plant and obtaining simulated sensor data and a simulated plant response from the simulation of the nuclear power plant; and generating a trained neural network trained to determine the at least one control system setting for the nuclear power plant based on a desired plant response for the nuclear power plant using the training and test data.

In one embodiment, a nuclear power plant comprises: a plurality of sensors structured to generate sensor data; a plurality of components; a control system having a plurality of control system settings and being structured to control a portion of the plurality of components based on the control system settings; and a neural network, structured to receive the sensor data and a desired plant response, wherein the neural network has been previously trained using a simulated nuclear power plant and is structured to determine at least one control system setting to achieve the desired plant response, wherein the control system is structured to set or change one or more of the plurality of control system settings to the at least one control system setting determined by the neural network.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
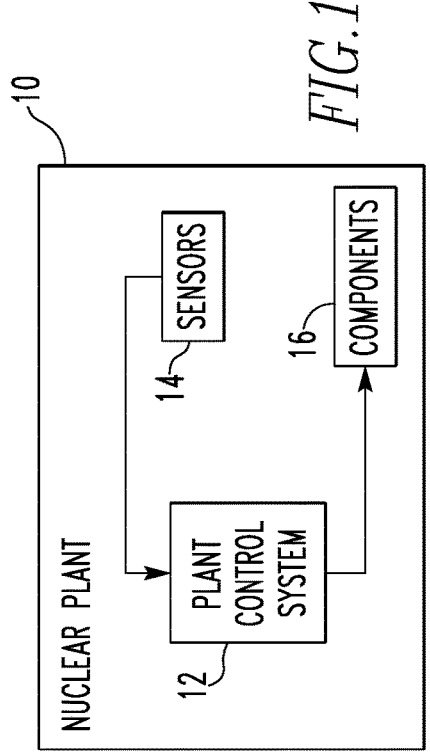
FIG. 1 is a simplified schematic diagram of a nuclear power plant 10.

As used herein, the singular form of "a", "an", and "the" include plural references unless the context dictates otherwise.

As used herein, the statement that two or more parts or components are "coupled" shall mean that the parts are joined or operate together either directly or indirectly, i.e., through one or more intermediate parts or components, so long as a link occurs.

As used herein, the term "number" shall mean one or an integer greater than one (i.e., a plurality).

As employed herein, the term "processor" shall mean a programmable analog and/or digital device that can store, retrieve and process data; a controller; a control circuit; a computer; a workstation; a personal computer; a microprocessor; a microcontroller; a microcomputer; a central processing unit; a mainframe computer; a mini-computer; a server; a networked processor; or any suitable processing device or apparatus.

The disclosed concept will now be described, for purposes of explanation, in connection with numerous specific details in order to provide a thorough understanding of the subject innovation. It will be evident, however, that the disclosed concept can be practiced without these specific details without departing from the spirit and scope of this innovation.

The disclosed concept relates to improving control systems of nuclear power plants using a neural network. In some example embodiments, a neural network is trained and tested in a simulated offline environment to determine at least one control setting for a nuclear power plant control system in order to achieve a desired plant response. The neural network may also be verified in a simulated offline environment. In some example embodiments of the disclosed concept, the neural network is implemented in an online environment (i.e., an operating nuclear power plant) to determine at least one control system setting for the control system of the nuclear power plant in order to achieve the desired plant response.

Nuclear power plants have not used machine learning techniques, such as neural networks, due in part to regulations. For example, the control systems of nuclear power plants needs to be deterministic. That is, plant operators need to know and understand how the control system is going to behave in response to various conditions.

Some example embodiments of the disclosed concept provide a neural network that is able to determine at least one control system setting for a nuclear power plant in order to provide a desired plant response (e.g., a steam generator level, etc.) when faced with various conditions within the nuclear power plant. In some example embodiments, the desired plant response may be a steam generator level, a pressurizer level, a pressurizer pressure, various parameters related to reactor control, various parameters related to rod control, various parameters related to steam dump control, and/or various other parameters associated with balance of plant systems. For example, transient events, degraded components, and other factors may affect the response of the nuclear power plant. In some example embodiments of the disclosed concept, the neural network is trained to provide at least one control system setting that will still result in the desired plant response in the face of such factors. Some example embodiments of training, testing, verifying, and implementing a neural network for determining at least one control setting for a nuclear power plant to achieve a desired plant response will be described herein.

Figure 2:
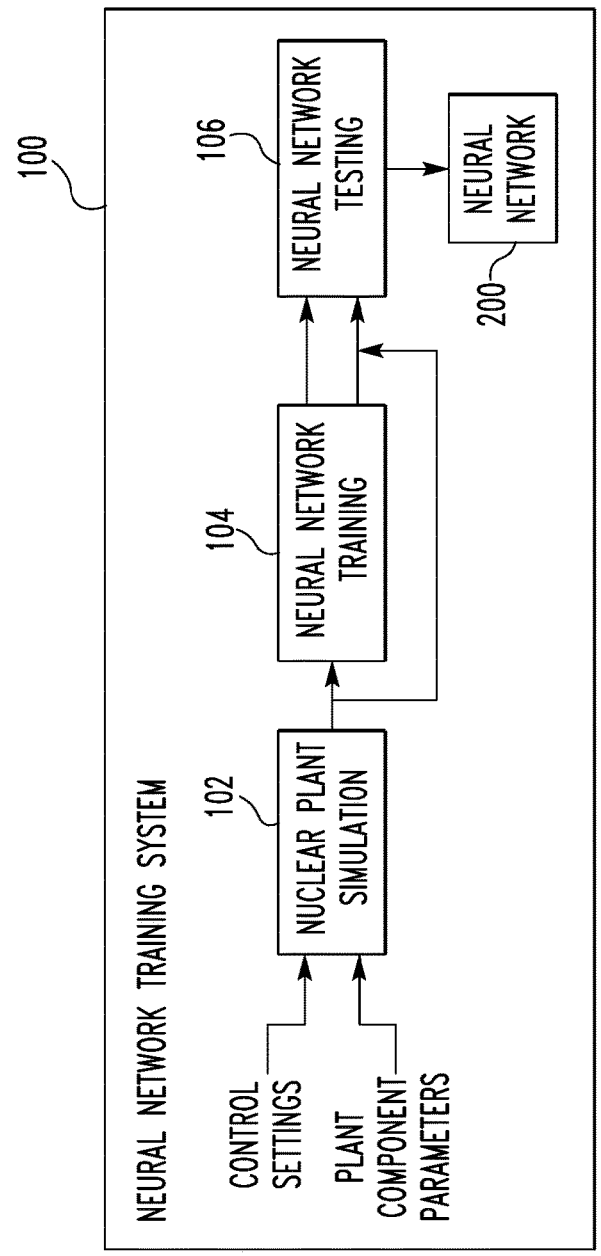
FIG. 2 is a schematic diagram of a neural network training system in accordance with an example embodiment of the disclosed concept.

FIG. 2 is a schematic diagram of a neural network training system 100 in accordance with an example embodiment of the disclosed concept. The neural network training system 100 may be implemented, for example, on a processing system such as a computer system or other such system including a processor and a memory. The processor may be, for example and without limitation, a microprocessor, a microcontroller, or some other suitable processing device or circuitry, that interfaces with the memory. The memory can be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. The memory may store one or more routines executable by the processor.

The neural network training system 100 includes a nuclear plant simulation 102, a neural network training module 104, and a neural network testing module 106. The nuclear plant simulation 102 may be a simulated model of a nuclear power plant that is structured to simulate the characteristics of an actual nuclear power plant. In some example embodiments of the disclosed concept, the nuclear plant simulation 102 may be a Combustion Engineering Transient Simulation (CENTS) developed by Westinghouse Electric Company. However, it will be appreciated that other nuclear plant simulations may be employed without departing from the scope of the disclosed concept. In the nuclear plant simulation 102, various plant parameters such as plant geometry and component capacities can be set. Additionally, various control system settings of the nuclear power plant can be set. With the plant parameters and the control system settings, the nuclear plant simulation 102 simulates the behavior of a nuclear power plant. From the nuclear plant simulation 102, the simulated response of a nuclear power plant, such as various data from sensors in the nuclear power plant can be observed.

In the neural network training system 100, the nuclear plant simulation 102 is used to generate test and training data for the neural network training module 104 and the neural network testing module 104, respectively. The training and test data are generated by running numerous (e.g., thousands) simulations with the nuclear plant simulation 102 with varied plant parameters and control system settings. The plant parameters may be varied to simulate component degradation, fouling, or fatigue. For example, pump capacity or valve flow coefficients may be varied in simulations to simulate degradation, fouling, or fatigue of pumps and valves in a nuclear power plant. Control system settings may also be varied. The plant parameters and control system settings for the simulations may be generated, for example, by randomly setting the plant parameters and control system settings based on a normal distribution with a mean about a nominal value and a standard deviation based on engineering judgment. Upper and lower bounds may also be placed on each parameter or setting. The plant parameters and control system settings that are varied may be selected based on their influence on a plant response characteristic of interest. For example, if the plant response characteristic of interest in the steam generator level, the plant parameters and control system settings that have a higher influence on the steam generator level may be varied in the simulations.

The simulations generate sensor data that would be available in a nuclear power plant such as, for example and without limitation, flows, temperatures, pressures, and valve positions. The sensor data corresponds to the plant parameters and control system settings for the particular simulation. The simulation may also generate a simulated plant response (e.g., the steam generator level based on the plant parameters and control system settings for the simulation). The control system settings and their corresponding simulated sensor data and plant response may be used as the test and training data for the neural network training module 104. In some example embodiments, a selected set of simulated sensor data and plant response may be included in the test and training data rather than all of the available simulated sensor data and plant response. In this manner, data of interest may be selected to improve the training of the neural network to target a plant response of interest. With the use of the nuclear plant simulation 102, it is possible to simulate a variety of conditions or transients to generate the test and training data. Such data could also be generated in an actual nuclear power plant. However, it is often unsafe or unwise to subject the nuclear power plant to the number of conditions or transients in order to generate the test and training data.

The output of the nuclear plant simulation 102 may be divided into training data and test data. The training data may be used to train the neural network and the test data may be used to test the neural network. The training data is provided to the neural network training module 104 and the test data is provided to the neural network testing module 106. In some example embodiments, the simulated sensor data, simulated plant response, and some of the control system settings are used as input features for the neural network training and one or more of the control system settings is used as the output label for the neural network training. In some example embodiments, only one of the control system settings is used as the output label for the neural network training.

The neural network training module 104 is structured to train the neural network to determine at least one control system setting that corresponds to a desired plant response based on the sensor data and other control system settings. For example, in some embodiments, the neural network training module 104 is structured to train the neural network to determine at least one control system setting to achieve the desired steam generator level based on the current sensor data and other control system settings. In this manner, when there is component degradation or other factors affecting the nuclear power plant, the neural network will be able to determine at least one control system setting to achieve the desired plant response. It does not matter whether the component degradation or other factors have been specifically identified. The neural network will still be able to determine the control setting to achieve the desired plant response.

The neural network training module 104 may employ any suitable method of training a neural network. It will be appreciated by those having ordinary skill in the art that the specifics of the training may be selected and varied without departing from the scope of the disclosed concept. For example, the specifics of the training for a particular plant response characteristic of interest (e.g., a steam generator level) may be determined through routine test and analysis. Similarly, the specifics of the training for another particular plant response characteristic of interest may be determined through routine test and analysis.

The neural network testing module 106 is structured to test the neural network using the test data. The neural network testing module 106 also receives the neural network from the neural network training module 104. The neural network testing module 106 is structured to test the accuracy of the neural network being trained by the neural network training module 104. For example, the neural network testing module 106 may input the simulated sensor data, plant response, and some of the control system settings into the neural network being trained and determine if it outputs the remaining control system settings corresponding to that simulation. In this manner, the accuracy of the neural network can be determined. For example, the accuracy of the neural network is higher the closer and more consistently the neural network is able to predict the remaining control system settings. In some example embodiments, when the neural network has reached a threshold level of accuracy, the neural network may be output as the trained neural network 200. The threshold level of accuracy may be determined based on the particular application without departing from the scope of the disclosed concept. In some example embodiments, the neural network may be output as the trained neural network 200 when the change in accuracy falls below a threshold level of change. For example, the accuracy of the neural network may tested after each training epoch. If the accuracy of the neural network levels off and does not improve by more than a threshold level after the next training epoch, it can be indicative that the maximum accuracy of the neural network has been reached and the neural network may be output as the trained neural network 200. The training data and the test data may be divided in any suitable proportion without departing from the scope of the disclosed concept.

Figure 3:
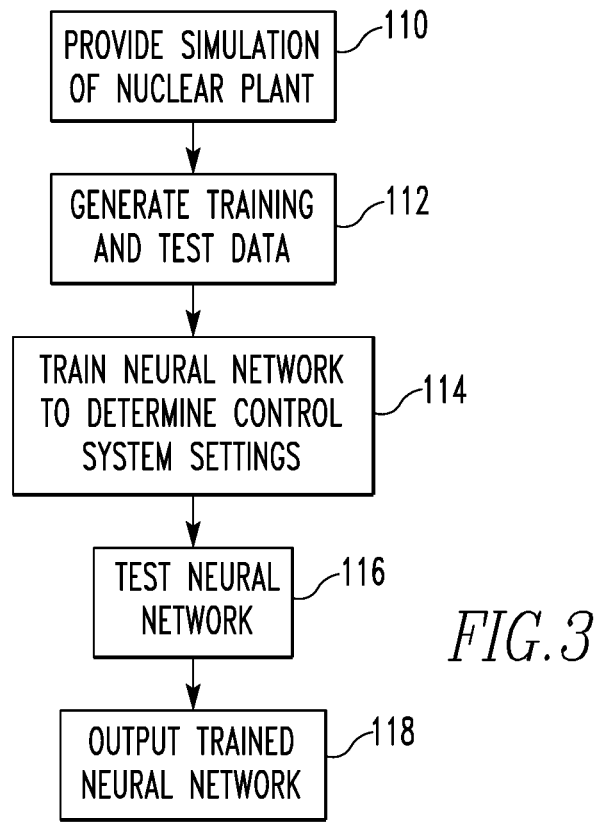
FIG. 3 is a flowchart of a method of training a neural network in accordance with an example embodiment of the disclosed concept.

FIG. 3 is a flowchart of a method of training a neural network in accordance with an example embodiment of the disclosed concept. The method of FIG. 3 may be implemented, for example, in the neural network training system 100 of FIG. 2. The method begins at 110 with providing a simulation of a nuclear power plant. In some example embodiments, the simulation may be the same or similar to the nuclear plant simulation 102 described with respect to FIG. 2. The method continues at 112 with generating training and test data 112. The training and test data may generated in the same or similar manner as was described with respect to FIG. 2.

At 114, the neural network is trained to determine at least one control system setting to achieve a desired nuclear power plant response. The neural network may be trained in the same or similar manner as described with respect to FIG. 2. At 116, the neural network is tested. The neural network may be tested in the same or similar manner as was described with respect to FIG. 2. In some embodiments, once the neural network has reached a threshold level of accuracy, the trained neural network may be output at 118. In some embodiments, when the change in accuracy of the neural network falls below a threshold level, the trained neural network may be output at 118. The trained neural network may be the same or similar to the trained neural network 200 described with respect to FIG. 2. The trained neural network is trained to determine at least one control system setting to achieve the desired nuclear power plant response. In some example embodiments, the trained neural network is structured to receive sensor data, some control system settings, and a desired nuclear power plant response (e.g., without limitation, a steam generator level) and to output the remaining one or more control system settings to achieve the desired nuclear power plant response.

Figure 4:
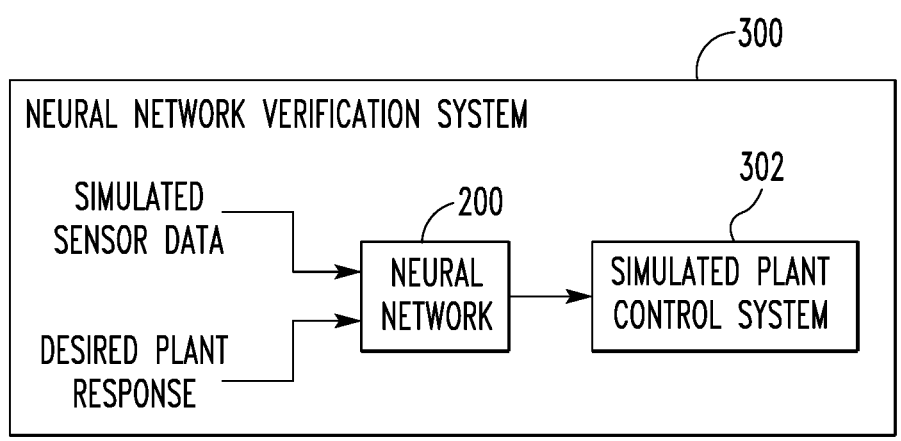
FIG. 4 is a schematic diagram of a neural network verification system in accordance with an example embodiment of the disclosed concept.

FIG. 4 is a schematic diagram of a neural network verification system 300 in accordance with an example embodiment of the disclosed concept. The neural network verification system 300 may be implemented, for example, on a processing system such as a computer system or other such system including a processor and a memory. The processor may be, for example and without limitation, a microprocessor, a microcontroller, or some other suitable processing device or circuitry, that interfaces with the memory. The memory can be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. The memory may store one or more routines executable by the processor. In some example embodiments, the neural network verification system 300 may be embodied in the same processing system as the neural network training system 300.

The neural network verification system 300 provides an additional level of verification of the trained neural network 200. The neural network verification system 300 includes the trained neural network 200 and a simulated nuclear power plant control system 302. Simulated sensor data and a desired plant response are input into the trained neural network 200. Some control system settings may also be input into the trained neural network 200. The trained neural network 200 outputs at least one control system setting to the simulated nuclear power plant control system 302 to achieve the desired plant response.

The simulated nuclear power plant control system 302 simulates the control system of a nuclear power plant and is structured to output one or more control signals based on the control system settings input into it. In the neural network verification system 300, the control system settings of the simulated nuclear power plant control system 302 may be manually setting. One or more control system settings may be received from the trained neural network 200. The simulated nuclear power plant control system 302 may set or change one or more of its control system setting to those received from the trained neural network 200.

The control signal output of the simulated nuclear power plant control system 302 may be observed in order to verify that the trained neural network 200 has provided acceptable control system settings. For example, the control signal output of the simulated nuclear power plant control system 302 may be compared to various threshold levels to verify that the control signal will result in acceptable conditions in the nuclear power plant. In some example embodiments, the control signal output of the simulated nuclear power plant control system 302 may be input to a nuclear power plant simulation such as the nuclear power plant simulation 102 described with respect to FIG. 2. The output of the nuclear power plant simulation 102 may be compared to threshold levels to verify that the control system settings output by the neural network 200 are acceptable. The neural network verification system 300 provides an additional level of verification to ensure that that trained neural network 200 will output control system settings that can be implemented in an actual nuclear power plant.

Figure 5:
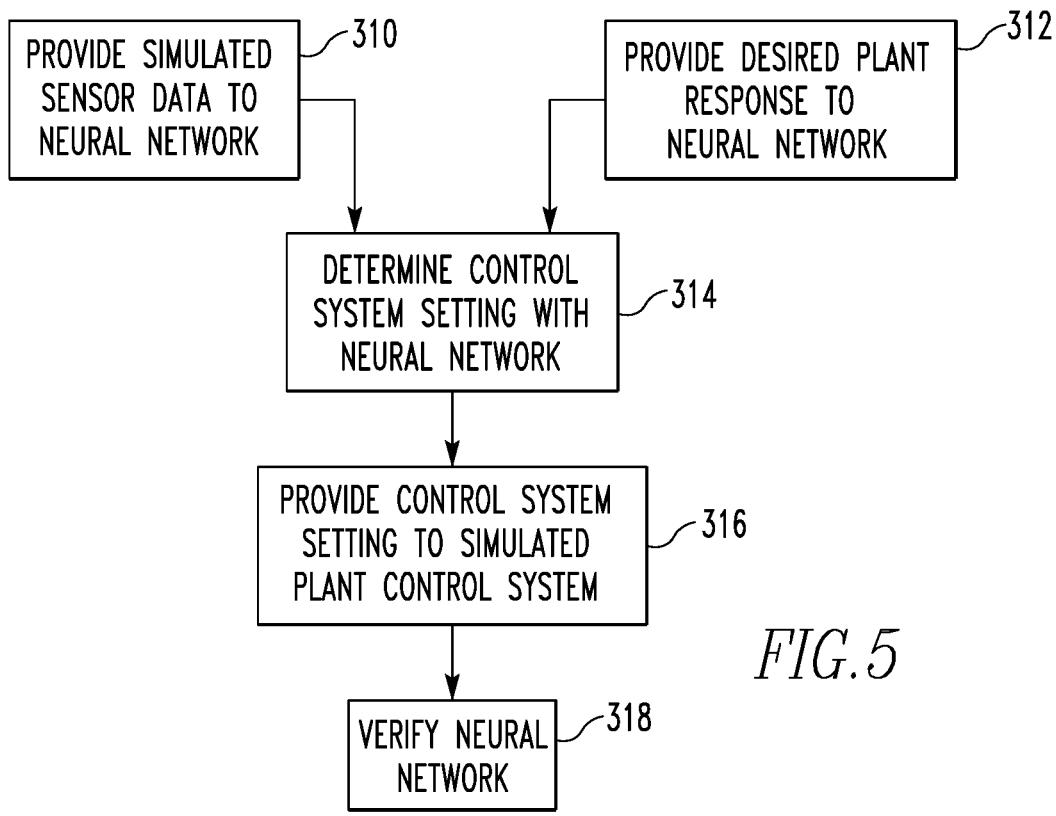
FIG. 5 is a flowchart of a method of verifying a neural network in accordance with an example embodiment of the disclosed concept.

FIG. 5 is a flowchart of a method of verifying a neural network in accordance with an example embodiment of the disclosed concept. The method of FIG. 5 may be implemented, for example, in the neural network verification system 300 of FIG. 4. The method begins at 310 with providing simulated sensor data to a trained neural network and at 312 with providing a desired plant response to the trained neural network. Some control system settings may also be provided to the trained neural network. The trained neural network may be the same or similar to the trained neural network 200 previously described. The method continues at 314 with determining at least one control system setting with the trained neural network. The at least one control system setting may be determined to achieve the desired plant response.

At 316, the at least one control system setting is provided to a simulated nuclear power plant control system. The simulated nuclear power plant control system may be the same or similar to the simulated nuclear power plant control system 302 described with respect to FIG. 4. The simulated nuclear power plant control system is structured to output a control signal based on its control system settings and may set or modify one or more of its control system settings to those received from the trained neural network.

The method continues at 318 where the trained neural network is verified. The trained neural network may be verified by comparing the control signal output of the simulated nuclear power plant control system to threshold levels the same or similar as was described with respect to FIG. 4. In some example embodiments, the control signal output of the simulated nuclear power plant control system may be input into a nuclear power plant simulation and the neural network may be verified by comparing the output of the nuclear power plant simulation to threshold levels the same or similar as was described with respect to FIG. 4.

Figure 6:
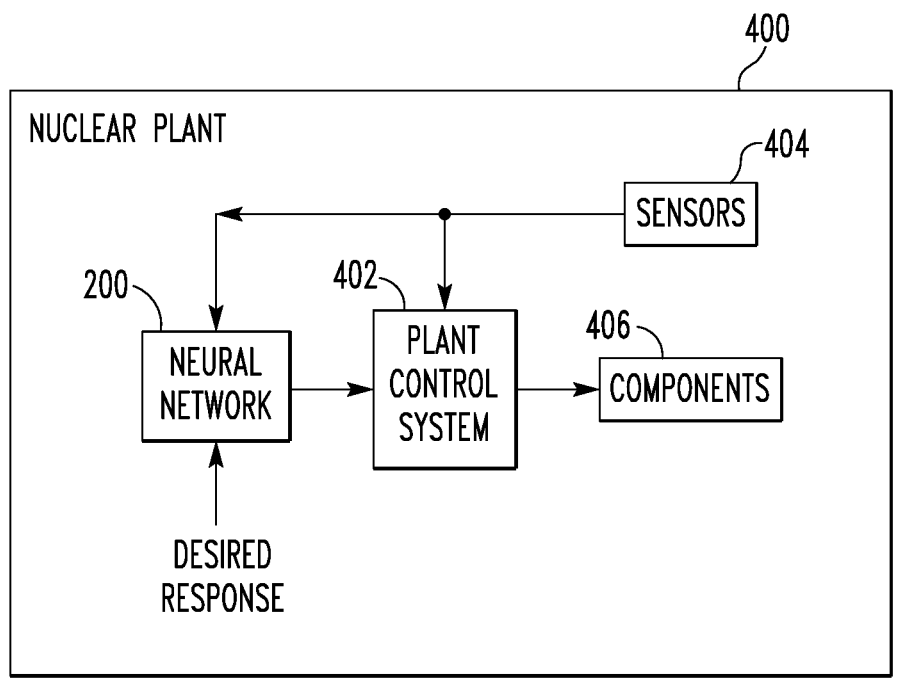
FIG. 6 is a schematic diagram of a nuclear power plant using a neural network in accordance with an example embodiment of the disclosed concept.

FIG. 6 is a schematic diagram of a nuclear power plant 400 using a trained neural network 200 in accordance with an example embodiment of the disclosed concept. The nuclear power plant 400 may use the trained neural network 200 that was trained with the neural network training system 100 described with respect to FIG. 2. It will be appreciated that a trained neural network trained with another system may also be employed without departing from the scope of the disclosed concept. The trained neural network 200 has been previously trained to output at least one control system setting to achieve the desired plant response based on inputs such as sensor data and control system settings.

The nuclear power plant 400 includes a nuclear power plant control system 402, sensors 404, and components 406. The sensors 404 may include the sensors commonly found in nuclear power plants such as various sensors able to measure various flows, temperatures, pressures, valve positions, and other characteristics of the nuclear power plant. The components 406 may include various controllable components commonly found in nuclear power plants such as valves and pumps that are controllable. The nuclear power plant control system 402 is structured to control the controllable components 406 based on control system settings.

The trained neural network 200 is structured to receive a desired plant response (e.g., without limitation, a steam generator level) that may, for example and without limitation, be manually input by a user or technician. The trained neural network 200 is also structured to receive sensor data from the sensors 404. The trained neural network 200 may also receive one or more control settings from the nuclear power plant control system 402. Based on its inputs, the trained neural network 200 is structured to determine at least one control system setting to achieve the desired plant response and to provide the at least one control system setting to the nuclear power plant control system 402.

The nuclear power plant control system 402 is structured to set or change one or more of its control system settings to the control system setting received from the neural network 200 and, in turn, to control the controllable components 406 based on the control system settings. As the neural network 200 has been trained to determine at least one control system setting to achieve the desired plant response, controlling the components 406 based on the at least one control system setting output by the neural network 200 will result in the response of the nuclear power plant 400 being at or close to the desired plant response. It is not necessary to specifically identify any event or transient, such as a specifically degraded one of the components 406 or other factor affecting the nuclear power plant 400 as the neural network 200 will be able to determine the at least one control system setting without specifically identifying one or a combination of specific events or transients.

Figure 7:
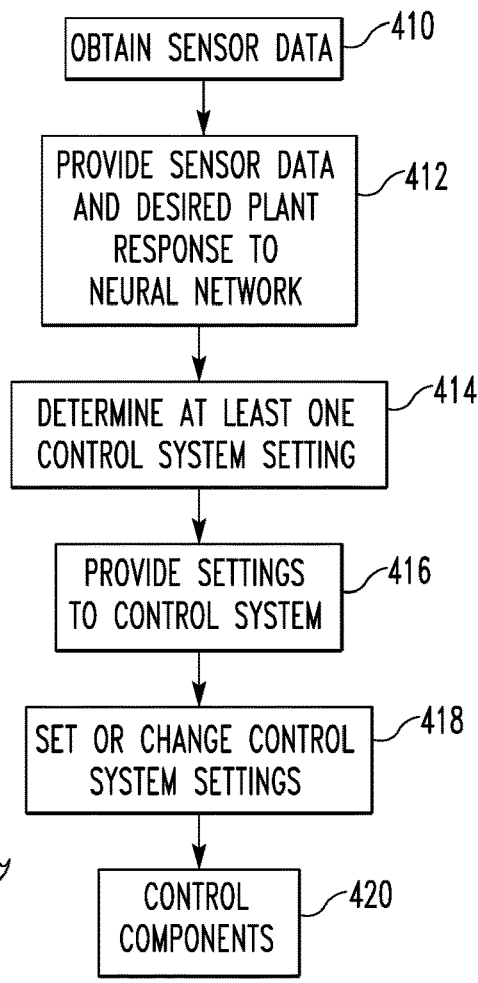
FIG. 7 is flowchart of a method of determining at least one control system setting for a nuclear power plant using a neural network in accordance with an example embodiment of the disclosed concept.

FIG. 7 is flowchart of a method of determining at least one control system setting for a nuclear power plant using a neural network in accordance with an example embodiment of the disclosed concept. The method of FIG. 7 may be implemented, for example, in the nuclear power plant 400 of FIG. 6. The method begins at 410 with obtaining sensor data. The sensor data may be obtained from the same or similar sensors 404 as those described in FIG. 6. The method continues at 412 with providing the sensor data and a desired plant response to a neural network. Some control system settings may also be provided to the neural network. The neural network has previously been trained to determine at least one control system setting to achieve the desired plant response based on inputs such as sensor data and control system settings. The neural network may be the same or similar to the trained neural network 200 previously described.

The method continues at 414 with determining at least one control system setting with the neural network to achieve the desired plant response. At 416, the at least one control system setting is provided to a nuclear power plant control system. The nuclear power plant control system may be the same or similar to the nuclear power plant control system 402 described with respect to FIG. 6. The nuclear power plant control system is structured to set or change one or more of its control system settings to the at least one control system setting output by the neural network and does so at 418. At 420, the nuclear power plant control system controls components of the nuclear power plant based on its control system settings, including those settings set or changed to those output by the neural network. The components may be the same or similar to the components 406 described with respect to FIG. 6. As the neural network has been trained to determine at least one control system setting to achieve the desired plant response, controlling the components based on the at least one control system setting output by the neural network will result in the response of the nuclear power plant being at or close to the desired plant response.

Figure 8:
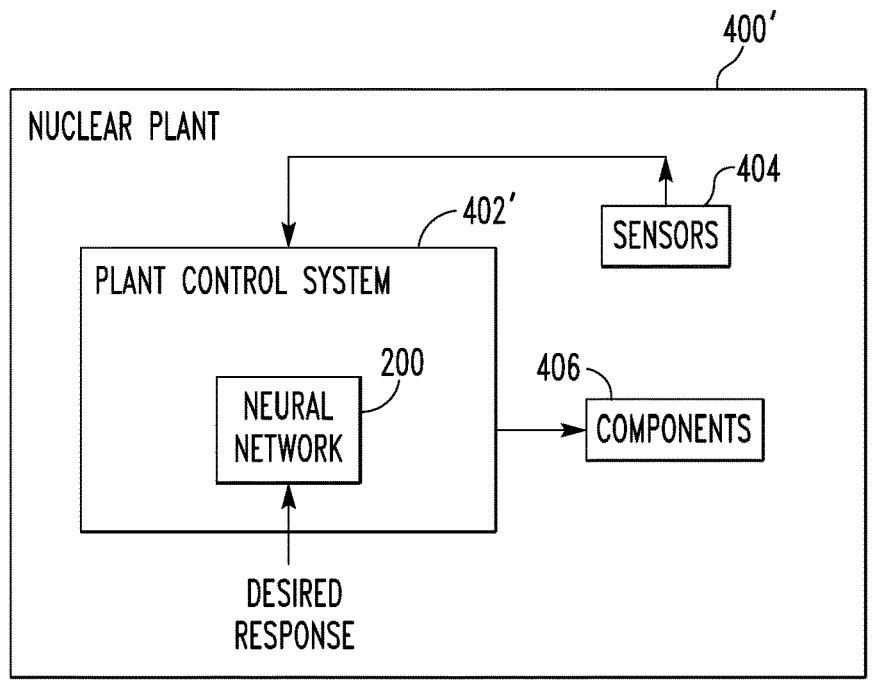
FIG. 8 is a schematic diagram of a nuclear power plant using a neural network in accordance with an example embodiment of the disclosed concept.

FIG. 8 is a schematic diagram of a nuclear power plant 400' using a neural network 200 in accordance with an example embodiment of the disclosed concept. The nuclear power plant 400' of FIG. 8 is similar to the nuclear power plant 400 of FIG. 6. However, in the nuclear power plant 400' of FIG. 8, the neural network 200 has been integrated into the nuclear power plant control system 402'. In the embodiment described in FIG. 6, an existing nuclear power plant control system 402 can be used in conjunction with the neural network 200 without changing the nuclear power plant control system 402, while in the present embodiment, the neural network 200 is incorporated into the nuclear power plant control system 402'. Thus, the nuclear power plant control system 402' can use the neural network 200 to update at least one of its control system setting to achieve the desired plant response.

It will be appreciated that the disclosed concept is not limited to a single neural network. For example, multiple neural networks may be trained based on different desired plant response characteristics, different control systems settings, or various other factors. For example, one neural network may be trained based on achieving a desired steam generator level while another neural network may be trained based on achieving another desired plant response characteristic. Similarly, neural networks may be trained to adjust certain control system settings to achieve the desired plant response. Furthermore, neural networks may also be trained for specific transients or events. For example, one neural network may be used to determine control system settings in response to a transient or event such as a reactor trip and another neural network may be used to determine control system settings to respond to a pump trip. One or multiple neural networks may be employed in a nuclear power plant without departing from the scope of the disclosed concept. For example, a nuclear power plant may include multiple neural networks and a user or technician may select which neural network to use to determine one or more control system settings based on the desired plant response or which control system setting to change.

In some example embodiments, the disclosed concept may be employed to determine one or more control system settings for a nuclear power plant to achieve a desired plant response. The one or more control system settings may then be manually set or changed in the control system of the nuclear power plant. In this example embodiment, one or more trained neural networks, such as the neural network 200 described herein, may be generated. The one or more trained neural networks may be used to determine one or more control system settings for the control system of the nuclear power plant. Then, the control system settings may be manually set or changed in the control system of the nuclear power plant. This embodiment may streamline the analysis for existing nuclear power plants and may be used to determine optimal control system settings. The one or more trained neural networks may be used determine static control system settings for the nuclear power plant. However, it will be appreciated that the control system settings may be updated periodically or in response to transients or events.

It is also contemplated that aspects of the disclosed concept can be embodied as computer readable codes on a tangible computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A method of controlling a nuclear power plant, the method comprising:
    obtaining sensor data from one or more sensors of the nuclear power plant;
    providing the sensor data and a desired plant response to a neural network, wherein the neural network has been previously trained using a simulated nuclear power plant and is structured to determine at least one control system setting to achieve the desired plant response;
    determining at least one control system setting to achieve the desired plant response with the neural network; and
    setting or changing at least one control system setting of a control system of the nuclear power plant to the at least one control system setting determined by the neural network.

2. The method of claim 1, wherein the one or more sensors are structured to measure at least one of flows temperatures, pressures, and valve positions.

3. The method of claim 1, further comprising:
    controlling one or more components of the nuclear power plant based on the set or changed at least one control system setting of the control system.

4. The method of claim 3, wherein the components include at least one of a pump and a valve.

5. The method of claim 1, further comprising:
    selecting the neural network from a plurality of neural networks, wherein the plurality of neural networks have been previously trained using the simulated nuclear power plant to determine at least one control system setting to achieve the desired plant response based on different transients or events.

6. The method of claim 1, further comprising:
    outputting the at least one control system setting determined by the neural network to the control system, wherein the neural network is separate from the control system.

7. The method of claim 1, wherein the neural network is integrated into the control system.

8. The method of claim 1, wherein the neural network has been previously trained using the simulated nuclear power plant to determine at least one control system setting to achieve the desired plant response based on the sensor data.

9. The method of claim 1, further comprising:
    providing one or more existing control system settings to the neural network,
    wherein the neural network has been previously trained using the simulated nuclear power plant to determine at least one control system setting to achieve the desired plant response based on the sensor data and the one or more existing control system settings.

10. A method of training a neural network to determine at least one control system setting for a nuclear power plant, the method comprising:
    providing a simulation of the nuclear power plant;
    generating training and test data by inputting a plurality of control system settings and nuclear power plant parameters into the simulation of the nuclear power plant and obtaining simulated sensor data and a simulated plant response from the simulation of the nuclear power plant; and
    generating a trained neural network trained to determine the at least one control system setting for the nuclear power plant to achieve a desired plant response for the nuclear power plant using the training and test data.

11. The method of claim 10, wherein the training and test data include a subset of the plurality of control system settings, a subset of the simulated sensor data, and the simulated plant response.

12. The method of claim 11, wherein generating the trained neural network includes training the neural network using a first portion of the subset of the plurality of control system settings, the subset of the simulated sensor data, and the simulated plant response as input features and a second portion of the subset of the plurality of control system settings as an output label.

13. The method of claim 10, further comprising:
    dividing the training and test data into training data and test data,
    wherein generating the trained neural network includes training the neural network to determine the at least one control system setting for the nuclear power plant based on a desired plant response for the nuclear power plant with the training data and testing the neural network with the test data.

14. The method of claim 10, further comprising:
    verifying the trained neural network using a simulated nuclear power plant control system.

15. The method of claim 14, wherein verifying the trained neural network includes:
    providing simulated sensor data to the trained neural network;
    providing the desired plant response to the trained neural network;
    determining the at least one control system setting with the trained neural network;
    providing the at least one control system setting to the simulated nuclear power plant control system; and
    verifying a control signal output of the simulated nuclear power plant control system is within predetermined threshold levels.

16. The method of claim 10, wherein the trained neural network is trained to determine the at least one control system setting for the nuclear power plant to achieve the desired plant response based on one or more selected transients or events.

17. The method of claim 10, wherein generating the training and test data includes randomly setting the plurality of control system settings and nuclear power plant parameters based on a normal distribution with a mean about a nominal value.

18. The method of claim 10, wherein the trained neural network is trained to determine the at least one control system setting for the nuclear power plant to achieve the desired plant response based on sensor data and existing control system settings.

19. The method of claim 10, wherein the simulated sensor data includes simulated outputs of one or more sensors structured to measure at least one of flows temperatures, pressures, and valve positions.

20. A nuclear power plant comprising:
   a plurality of sensors structured to generate sensor data;
   a plurality of components;
   a control system having a plurality of control system settings and being structured to control a portion of the plurality of components based on the plurality of control system settings; and
   a neural network, structured to receive the sensor data and a desired plant response, wherein the neural network has been previously trained using a simulated nuclear power plant and is structured to determine at least one control system setting to achieve the desired plant response,
   wherein the control system is structured to set or change one or more of the plurality of control system settings to the at least one control system setting determined by the neural network.

* * * * *